United States Patent
Bonavente et al.

(10) Patent No.: US 12,261,533 B2
(45) Date of Patent: Mar. 25, 2025

(54) CIRCUIT FOR DETECTING POWER IN A MULTI-STAGE POWER CONVERTER

(71) Applicant: Power Integrations, Inc., San Jose, CA (US)

(72) Inventors: Daryll Plaza Bonavente, Quezon (PH); Rahul Prabhakar Joshi, Pleasanton, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 182 days.

(21) Appl. No.: 18/046,864

(22) Filed: Oct. 14, 2022

(65) Prior Publication Data

US 2024/0128875 A1 Apr. 18, 2024

(51) Int. Cl.
*H02M 1/00* (2007.01)
*H02M 1/42* (2007.01)
*H02M 3/335* (2006.01)
*H02M 1/10* (2006.01)
*H02M 1/34* (2007.01)

(52) U.S. Cl.
CPC ..... *H02M 3/33507* (2013.01); *H02M 1/0006* (2021.05); *H02M 1/0009* (2021.05); *H02M 1/0032* (2021.05); *H02M 1/0048* (2021.05); *H02M 1/0064* (2021.05); *H02M 1/007* (2021.05); *H02M 1/4208* (2013.01); *H02M 1/4225* (2013.01); *H02M 3/33523* (2013.01); *H02M 1/10* (2013.01); *H02M 1/348* (2021.05)

(58) Field of Classification Search
CPC ............. H02M 1/0009; H02M 1/0032; H02M 1/0048; H02M 1/0064; H02M 1/007; H02M 1/10; H02M 1/34; H02M 1/346; H02M 1/348; H02M 1/42; H02M 1/4208; H02M 1/4225; H02M 3/335; H02M 3/33507; H02M 3/33561; H02M 3/33569; H02M 3/33523
See application file for complete search history.

(56) References Cited

U.S. PATENT DOCUMENTS

| | | | | |
|---|---|---|---|---|
| 2014/0346874 A1* | 11/2014 | Fang | ............. | H05B 45/385 |
| | | | | 307/31 |
| 2016/0105095 A1* | 4/2016 | Mayell | ............. | H02M 1/4225 |
| | | | | 323/205 |
| 2022/0224222 A1* | 7/2022 | Poon | ............. | H02M 3/1582 |
| 2022/0255442 A1* | 8/2022 | Morrison | ............. | H02M 1/0048 |
| 2022/0368237 A1* | 11/2022 | Oshima | ............. | H02M 1/0064 |

FOREIGN PATENT DOCUMENTS

WO WO-2015063870 A1 * 5/2015 ........ H02M 3/33523

* cited by examiner

*Primary Examiner* — Thienvu V Tran
*Assistant Examiner* — Shahzeb K Ahmad
(74) *Attorney, Agent, or Firm* — ARENTFOX SCHIFF LLP

(57) ABSTRACT

Aspects of the present disclosure describe power converters. A power converter in accordance with an aspect of the present disclosure may comprise a first stage, a second stage electrically coupled to the first stage, the second stage including an energy transfer element, and a sensor. The sensor may include a first circuit and a second circuit. The first circuit and the second circuit may respond differently to an output of the energy transfer element. The sensor may be configured to selectively provide power to the first stage based on a difference in response of the first circuit and the second circuit.

18 Claims, 17 Drawing Sheets

CIRCUIT FOR DETECTING POWER IN A MULTI-STAGE POWER CONVERTER

FIELD OF THE DISCLOSURE

The present disclosure relates to a circuit for detecting power in a multi-stage power converter.

BACKGROUND INFORMATION

Many electronic devices, such as cell phones, laptops, etc., are powered by direct current (dc) power derived from a power supply. Conventional wall outlets generally deliver a high voltage alternating current (ac) power that needs to be converted to regulated dc power to be used as a power source for consumer electronic devices. Switch mode power converters, and multi-stage power converters, are commonly used due to their high efficiency, small size, and low weight to convert a high voltage ac power to a regulated dc power.

A multi-stage power converter may use multiple converter stages (e.g., multiple power converter and/or switch-mode power converter stages). For instance, a multi-stage power converter may include a power factor correction (PFC) stage cascaded with a flyback converter stage. However, a multi-stage power converter may be more efficient if one or more of the stages can be selectively powered or bypassed during operation.

BRIEF DESCRIPTION OF THE DRAWINGS

Non-limiting and non-exhaustive embodiments are described with reference to the following figures, wherein like reference numerals refer to like parts throughout the various views unless otherwise specified.

Figure 1A:
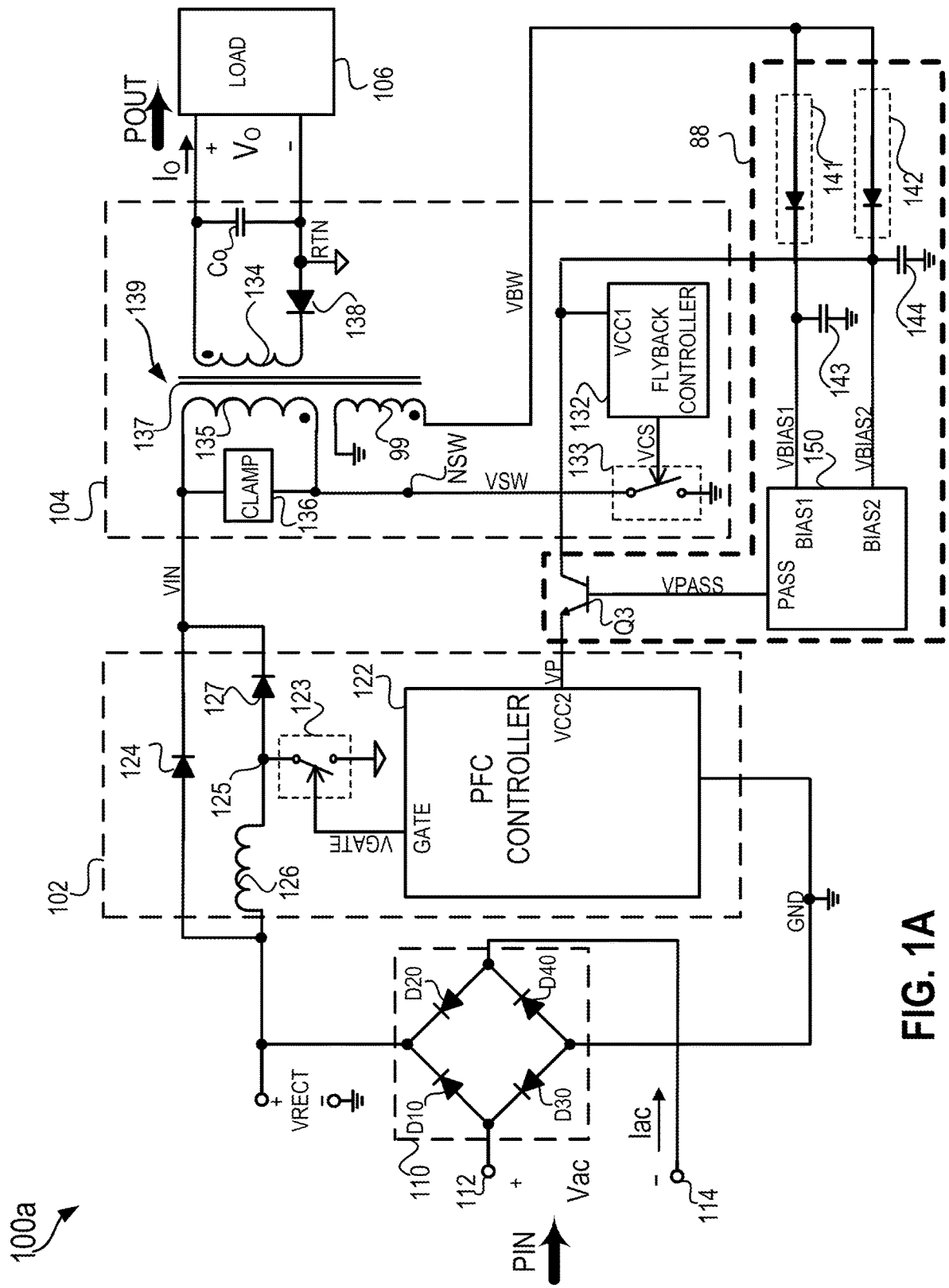
FIG. 1A illustrates a multi-stage power converter according to an exemplary embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the teachings herein. Also, common but well-understood elements that are useful or necessary in a commercially feasible embodiment are often not depicted in order to facilitate a less obstructed view of these various embodiments presented herein.

DETAILED DESCRIPTION

The detailed description set forth below discloses various embodiments to provide a thorough understanding of the present disclosure. It is understood that these exemplary embodiments are intended to illustrate rather than limit the present disclosure. Other embodiments within the scope of the present disclosure will become readily apparent to those skilled in the art from the following detailed description. The exemplary embodiments described herein may be implemented in other and different forms, and its several details are capable of modification in various other respects. In some instances, the specific details of the various embodiments need not be employed to practice the teachings herein. In other instances, well-known structures, components, materials or methods may not be described, or shown in block diagram form, in order to avoid obscuring the present disclosure.

Reference throughout this specification to "one embodiment", "an embodiment", "an exemplary embodiment", "one example" or "an example" means "serving as an example, instance, or illustration," and should not necessarily be construed as preferred or advantageous over other examples presented in this disclosure. A particular feature, structure or characteristic described in connection with the embodiment or example is included in at least one embodiment. Thus, appearances of the phrases "in one embodiment", "in an embodiment", "in an exemplary embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Any reference to an element herein using a designation such as "first," "second," and so forth does not limit the quantity or order of those elements. Rather, these designations are used herein as a convenient method of distinguishing between two or more elements or instances of an element. Thus, a reference to first and second elements does not mean that only two elements can be employed, or that the first element must precede the second element. As used herein, references to the plural include the singular, and references to the singular include the plural.

The term "switch" as used in the present disclosure includes any for making or breaking a connection in an electric circuit including without limitation, mechanical and electrical switches, bipolar transistors, field-effect transistors (FETs), metal-oxide-semiconductor FETs (MOSFETs), logic gates, or any other suitable device that performs a switching function.

In the context of the present disclosure, when a transistor is in an "off-state" or "off" the transistor blocks current and/or does not substantially conduct current. Conversely, when a transistor is in an "on-state" or "on" the transistor is able to substantially conduct current. By way of example, in one embodiment, a high-voltage transistor comprises an N-channel metal-oxide-semiconductor (NMOS) field-effect transistor (FET) with the high-voltage being supported between the first terminal, a drain, and the second terminal, a source. In some embodiments an integrated controller circuit may be used to drive a power switch when regulating energy provided to a load. Also, for purposes of this disclosure, "ground" or "ground potential" refers to a reference voltage or potential against which other voltages or potentials of an electronic circuit or integrated circuit (IC) are defined or measured. Additionally, according to power electronics theory (i.e., power is related to the rate of change of energy), "power" transfer may be implied by "energy" transfer; conversely, "energy" transfer may be implied by "power" transfer.

A power converter and/or a power converter stage (e.g. a flyback converter) according to the present disclosure may include primary and secondary controllers that are galvanically isolated (e.g., isolated by a communication link). Additionally, the primary controller and the secondary controller may be galvanically isolated from one another; and the secondary controller may transmit signals to the primary controller to control how the primary controller switches the primary power switch to control the transfer of energy from an energy transfer element (e.g., a transformer) to a load (e.g., to a universal serial bus, a power drawing device, etc.). For example, the secondary controller may transmit signals to the primary controller in response to a sensed output quantity of the power converter.

The primary and secondary controllers may operate to regulate an output quantity (e.g., voltage and/or current) of the power converter that is delivered to the load. For example, the primary and secondary controllers may operate to regulate the output voltage of the power converter to a desired output voltage value in response to a sensed output voltage. Although the primary and secondary controllers may regulate the output voltage in response to a sensed output voltage, in some examples, the primary and secondary controllers may regulate the output voltage and/or the output current of the power converter in response to a sensed output voltage and/or a sensed output current.

Power converters, including multi-stage power converters, are often specified to deliver power from low power levels to a maximum power level; and efficiency is often specified as a figure of merit in terms of input power and output power. For instance, efficiency may be quantified as a percentage (e.g., a ratio) of an input power that is delivered to a load (e.g., output power). Additionally, efficiency may be specified as a ratio of output power (e.g., load power) to input power (e.g., ac mains power).

Efficiency of a multi-stage power converter may be degraded as input power is decreased below its maximum. For instance, at input power levels less than seventy-five percent of maximum, efficiency may be degraded, at least in part, due to the power necessitated by individual stages (e.g., by a power factor correction stage and/or a flyback converter stage). Accordingly, there is a need to reduce supply power (e.g., bias supply power) to one or more of the stages in a multi-stage power converter operating at input power levels less than maximum.

As the load power changes, similar issues with the efficiency of the multi-stage power converter exist. At some load power levels, multiple stages may be used to deliver power. However, at other power levels, the multi-stage power converter would be more efficient if one or more of the stages of the multi-stage power converter were turned off or bypassed by the power delivery from input to load.

Various techniques for a power detection circuit will now be described. These techniques will be presented in the context of multi-stage power converters that use power detection to selectively power or bypass one or more stages. While these techniques may be well suited for these applications, those skilled in the art will realize that such techniques may be extended to other applications. Accordingly, any reference to a multi-stage power converter is intended only to illustrate various aspects of the present disclosure, with the understanding that such aspects may have a wide range of applications.

In an exemplary embodiment of a power converter, an energy transfer element of one stage is used to transfer energy to the load. The energy transfer element may be a transformer or other suitable device. The energy transfer element can be employed in a feedback loop to selectively provide power to another stage in the multi-stage power converter. By way of example, a first stage may be a power factor correction circuit and a second stage may be a flyback converter that uses the energy transfer element to deliver the power to the load. However, the first and second stages, as well as additional stages in some embodiments may be implemented in different ways. Those skilled in the art will readily be able to determine the manner in which the various states based on the present disclosure depending on the particular application and the overall design parameters.

A sensor may be employed to respond to an output of the energy transfer element in the first stage. The output may be provided to the sensor by a bias winding associated with the energy transfer element or by any other suitable means. The sensor may be configured to selectively provide power to the second stage, or cause the second stage to be bypassed, based on the response. In at least one embodiment, the sensor may be implemented with two circuits, each which responds differently to the output of the energy transfer element. Each circuit may include a diode and/or other components that together, or individually, cause the different responses to the output from the energy transfer element. For example, one circuit may include a diode having a reverse recovery time different from the reverse recovery time of the diode in the other circuit. Those skilled in the art will readily understand how to determine the manner in which the various states depend on the particular application and the overall design parameters.

FIG. 1A illustrates a multi-stage power converter 100a according to an exemplary embodiment of the present disclosure.

The multi-stage power converter 100a includes two stages: a power factor correction (PFC) stage 102 and a flyback converter stage 104. Additional stages may be included without departing from the scope of the present disclosure. The multi-stage power converter 100a also includes an auxiliary bias circuit 88 that selectively provides power to the PFC stage 102 based on feedback from the flyback converter stage 104.

Output power POUT is delivered to a load 106. The output power POUT may be determined, at least in part, by the load current Io and load voltage Vo. Load current Io and load voltage Vo may also be referred to as output current Io and output voltage Vo, respectively, without departing from the scope of the present disclosure.

Alternating current (ac) input power PIN (i.e., ac voltage Vac, ac current Iac) is provided to the full bridge rectifier 110 between input terminals 112, 114. The full bridge rectifier 110 includes four diodes D10, D20, D30, D40 and provides rectified dc voltage VRECT to the input of the PFC stage 102.

In turn the PFC stage 102 receives dc voltage VRECT and provides input voltage VIN to the flyback converter stage 104. The PFC stage 102 may include a PFC controller 122, a boost inductor 126, a boost diode 127, a power switch 123 connected to point 125 between boost inductor 126 and boost diode 127, and a bypass diode 124. As illustrated, the boost inductor 126, boost diode 127, and power switch 123 may be configured to boost the rectified dc voltage VRECT.

In accordance with switch mode power supply theory, when enabled the PFC controller 122 may provide gate signal VGATE to control switch 123 according to a switching cycle. In this manner the voltage VIN, provided to the flyback converter stage 104, may be greater than the rectified dc voltage VRECT. Alternatively, and additionally, the bypass diode 124 may transfer power to the flyback converter stage 104 when the PFC controller 122 is disabled. According to the teachings herein, the auxiliary bias circuit 88 may enable and disable (i.e., selectively provide power to) the PFC controller 122.

The flyback converter stage 104 includes an energy transfer element 139 (e.g., a transformer), an output capacitor Co, a primary switch 133, a clamp 136, and a flyback controller 132. The energy transfer element 139 includes a primary winding 135, a core 137, a secondary winding 134, and an auxiliary winding 99. The auxiliary winding 99 may also be referred to as a bias winding 99 and/or an auxiliary bias winding 99 without departing from the scope of the present disclosure. As illustrated, the input voltage VIN may be provided to the primary winding 135.

Figure 1B:
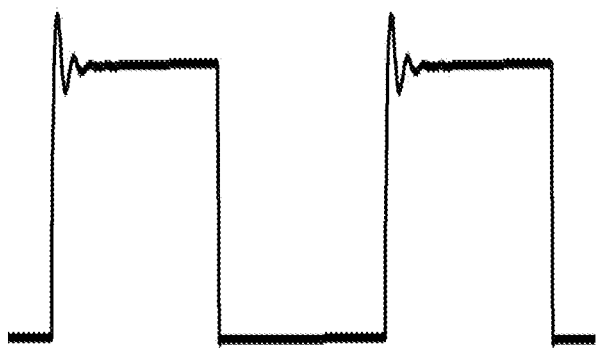
FIG. 1B illustrates an example bias winding voltage waveform provided by the auxiliary winding according to an exemplary embodiment of the present disclosure.

The flyback controller 132 may provide a gate signal VCS to the primary switch 133. When the primary switch 133 is on (i.e., closed), the primary winding 135 becomes energized. When the primary switch 133 turns off (i.e., opens), energy is transferred to the secondary winding 134 and to the auxiliary winding 99. The auxiliary winding 99 produces a bias winding voltage VBW that is provided to the auxiliary bias circuit 88. For emphasis, FIG. 1B shows an example waveform 89 of the bias winding voltage VBW provided by the auxiliary winding 99.

In accordance with power supply theory, clamp 136 may protect primary switch 133 by limiting the switch node voltage VSW during operation. Output capacitor Co may reduce ripple (i.e., variation) by filtering the output voltage Vo; and diode 138 may rectify current in the secondary winding 134.

The auxiliary bias circuit 88 may generate a first bias voltage VBIAS1 and a second bias voltage VBIAS2 from the bias winding voltage VBW. The first bias voltage VBIAS1 may be configured to have a different circuit response than that of the second bias voltage VBIAS2. For instance, the first bias voltage VBIAS1 exhibit a "fast" response to changes in the example waveform 89; while second bias voltage VBIAS2 may exhibit a "slow" response to changes in the example waveform 89. Possible differences in characteristics of the circuit responses of the first and second bias voltages VBIAS1, VBIAS2 are described hereinbelow.

Because of the difference in circuit response characteristics between the first bias voltage VBIAS1 and the second bias voltage VBIAS2, a voltage difference (VBIAS1−VBIAS2) can be obtained. This voltage difference may represent a change in load current Io. The voltage difference may also be a function of load current Io, which is related to input power PIN. Accordingly, the voltage difference between the first bias voltage VBIAS1 and the second bias voltage VBIAS2 may be related to input power PIN and may be calibrated against input power PIN.

Further, the voltage difference may be related to power drawn by the load, as the change in load current Io is shown by the voltage difference. As such, the voltage difference may also be related to output (load) power POUT; and the voltage difference may be used, via auxiliary bias circuit 88, to selectively provide power to the PFC stage 102 of the multi-stage power converter 100a as described herein.

The auxiliary bias circuit 88 includes a first circuit path 141 (which may be referred to as a "fast" circuit path 141), a second circuit path 142 (which may be referred to as a "slow" circuit path 142), an input power level detection circuit 150, filter capacitors 143-144, and a pass transistor Q3.

The first circuit path 141 is electrically coupled to a filter capacitor 143, to an input BIAS1 of the input power level detection circuit 150, and to a supply input VCC1 of the flyback controller 132. The second circuit path 142 is electrically coupled to a filter capacitor 144 and to an input BIAS2 of the input power level detection circuit 150.

As described above, the auxiliary winding 99 produces bias winding voltage VBW that is provided to the auxiliary bias circuit 88. The bias winding voltage VBW is an ac voltage that is rectified by second circuit path 142 to produce a positive cycle of the ac voltage and filtered by capacitor 144 to produce a dc source voltage. The dc source voltage is applied to the flyback controller 132 via the supply input VCC1. Other circuits (not shown) may be used to further process the dc source voltage, including without limitation, a voltage regulator. Since the dc source voltage to the flyback controller 132 is generated from the auxiliary winding 99, which requires an operational flyback controller, start-up circuitry (not shown) will be required to power the flyback controller 132. Those skilled in the art will readily understand how best to implement the start-up circuitry and regulate the dc source voltage generated by the auxiliary winding 99 based on the specific application and the overall design parameters.

First bias voltage VBIAS1 and second bias voltage VBIAS2, or the difference between the first bias voltage VBIAS1 and the second bias voltage VBIAS2, and/or the absolute value thereof, may be used as a feedback signal to generate pass signal VPASS. When pass signal VPASS turns on pass transistor Q3, the dc source voltage is supplied to PFC controller 122 via supply input VCC2. When pass transistor Q3 is off, PFC controller 122 is turned off (i.e., disabled), as supply input VCC2 is not supplied. Because the first bias voltage VBIAS1 and the second bias voltage VBIAS2 vary (i.e., as bias winding voltage VBW varies based on the signals passing through primary winding 135 and/or secondary winding 134 vary), the auxiliary bias circuit 88 will selectively control power application to PFC controller 122.

As primary winding 135 is energized, bias winding 99 is also energized, and waveform 89 is produced in bias winding 99. As load 106 draws power POUT, this changes the load current Io through secondary winding 134, which also changes the voltage and current through primary winding 135 and bias winding 99. These changes, along with changes created by PFC controller 122, may be represented as changes in waveform 89 of the bias winding voltage VBW. As such, auxiliary bias circuit 88, vis-à-vis bias winding 99 and bias winding voltage VBW, may convey the load conditions, (e.g., the load current Io) when a load 106 is connected to multi-stage power converter 100a.

The input power level detection circuit 150 passes (i.e., provides) the first bias voltage VBIAS1 and/or the second bias voltage VBIAS2 to the supply input VCC2 of the PFC controller 122 when the voltage difference (VBIAS1–VBIAS2) exceeds a threshold. The threshold may be based, at least in part, on empirical data, load parameters, circuit or component responses, or other parameters. Further, the threshold may be calibrated against a standard or desired value.

Figure 1C:
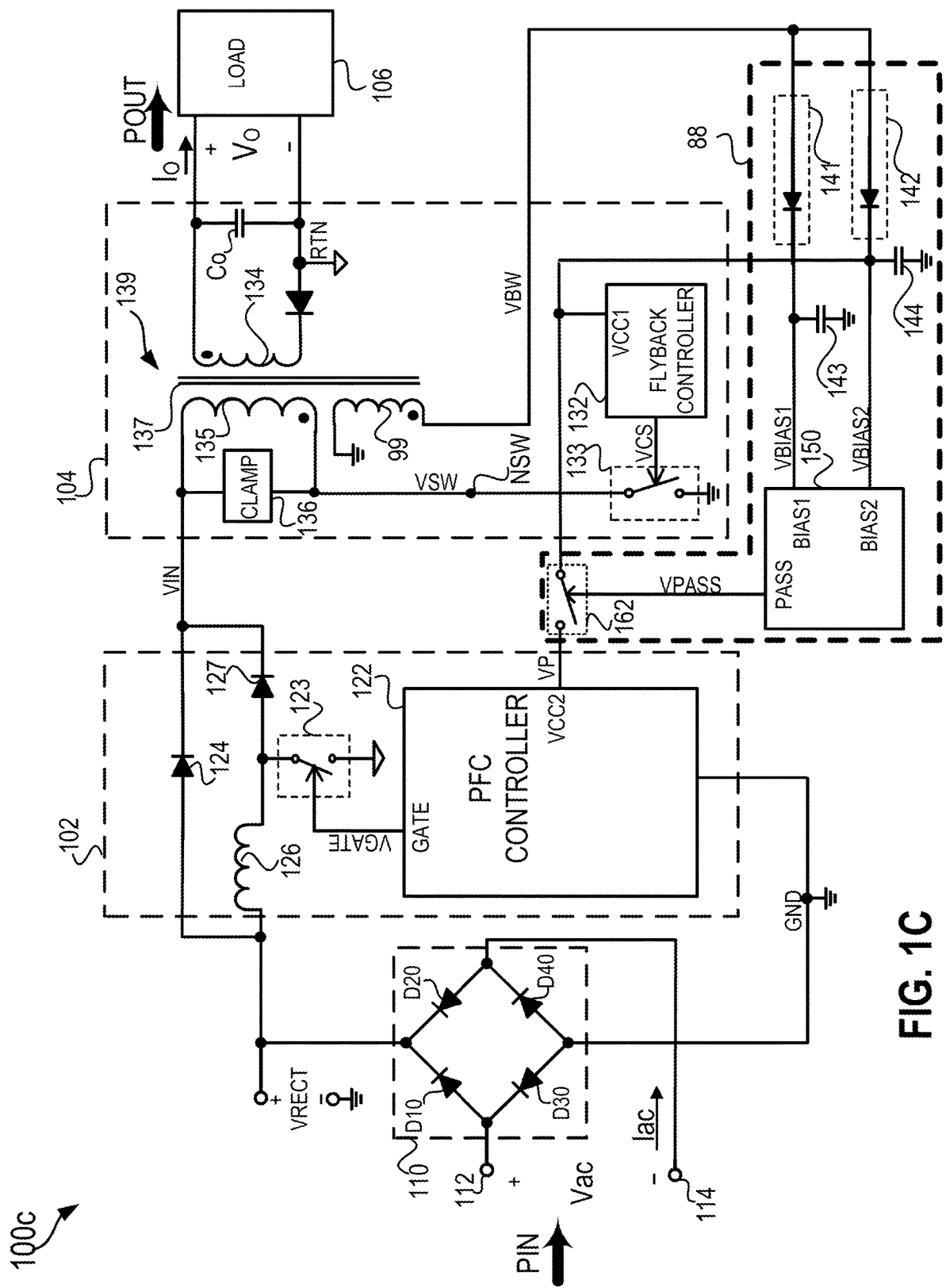
FIG. 1C illustrates a multi-stage power converter according to another exemplary embodiment of the present disclosure.

FIG. 1C illustrates a multi-stage power converter 100c according to another exemplary embodiment of the present disclosure.

The multi-stage power converter 100c is similar to that of multi-stage power converter 100a as described with respect to FIG. 1A, except pass transistor Q3 has been replaced with a load switch 162.

Figure 1D:
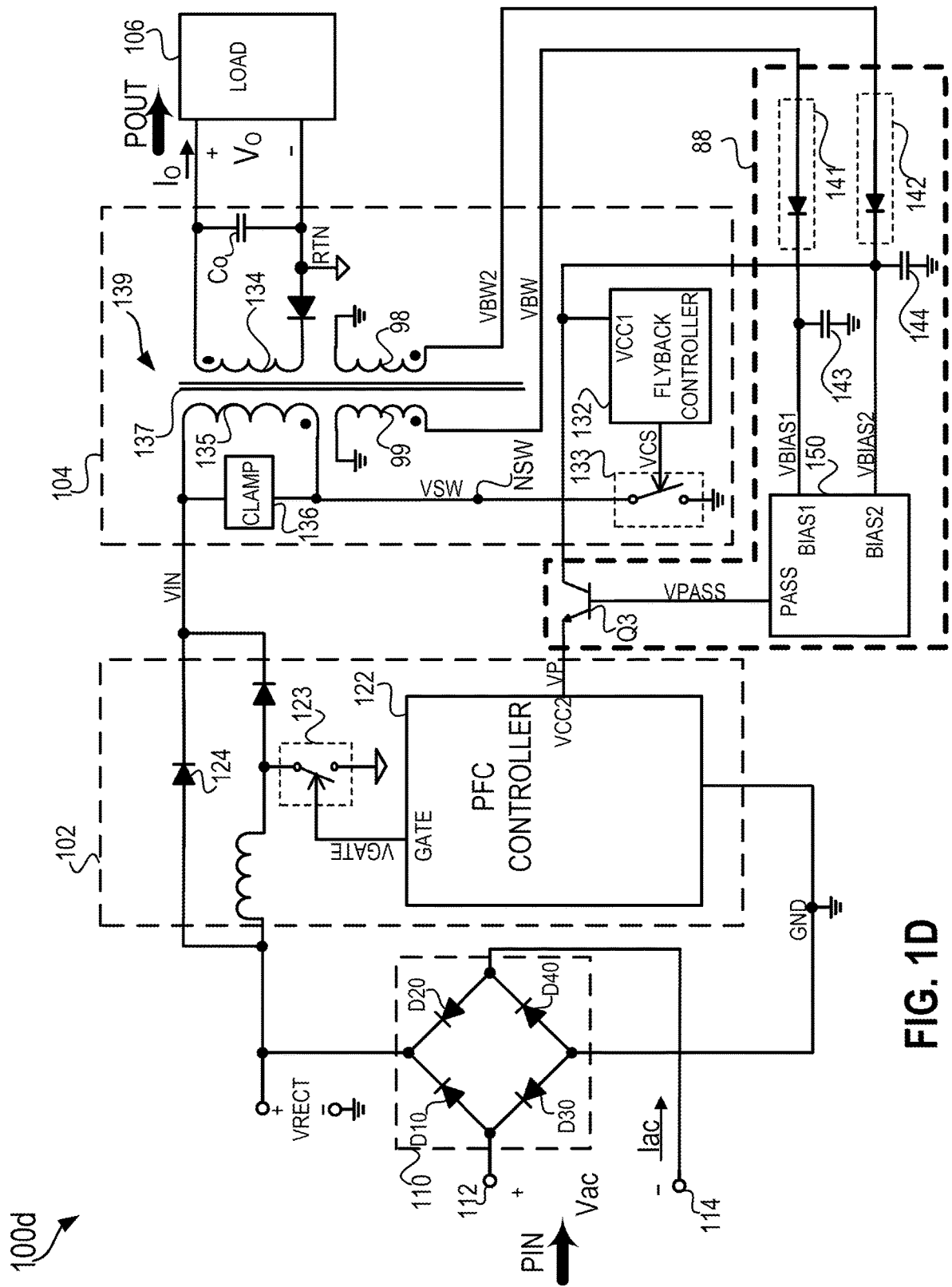
FIG. 1D illustrates a multi-stage power converter according to another exemplary embodiment of the present disclosure.

FIG. 1D illustrates a multi-stage power converter 100d according to another exemplary embodiment of the present disclosure.

The multi-stage power converter 100d is similar to that of multi-stage power converter 100a as described with respect to FIG. 1A except the second circuit path 142 is electrically coupled to a separate auxiliary winding 98. In this embodiment the second bias voltage VBIAS2 is generated from bias winding voltage VBW2.

Figure 2A:
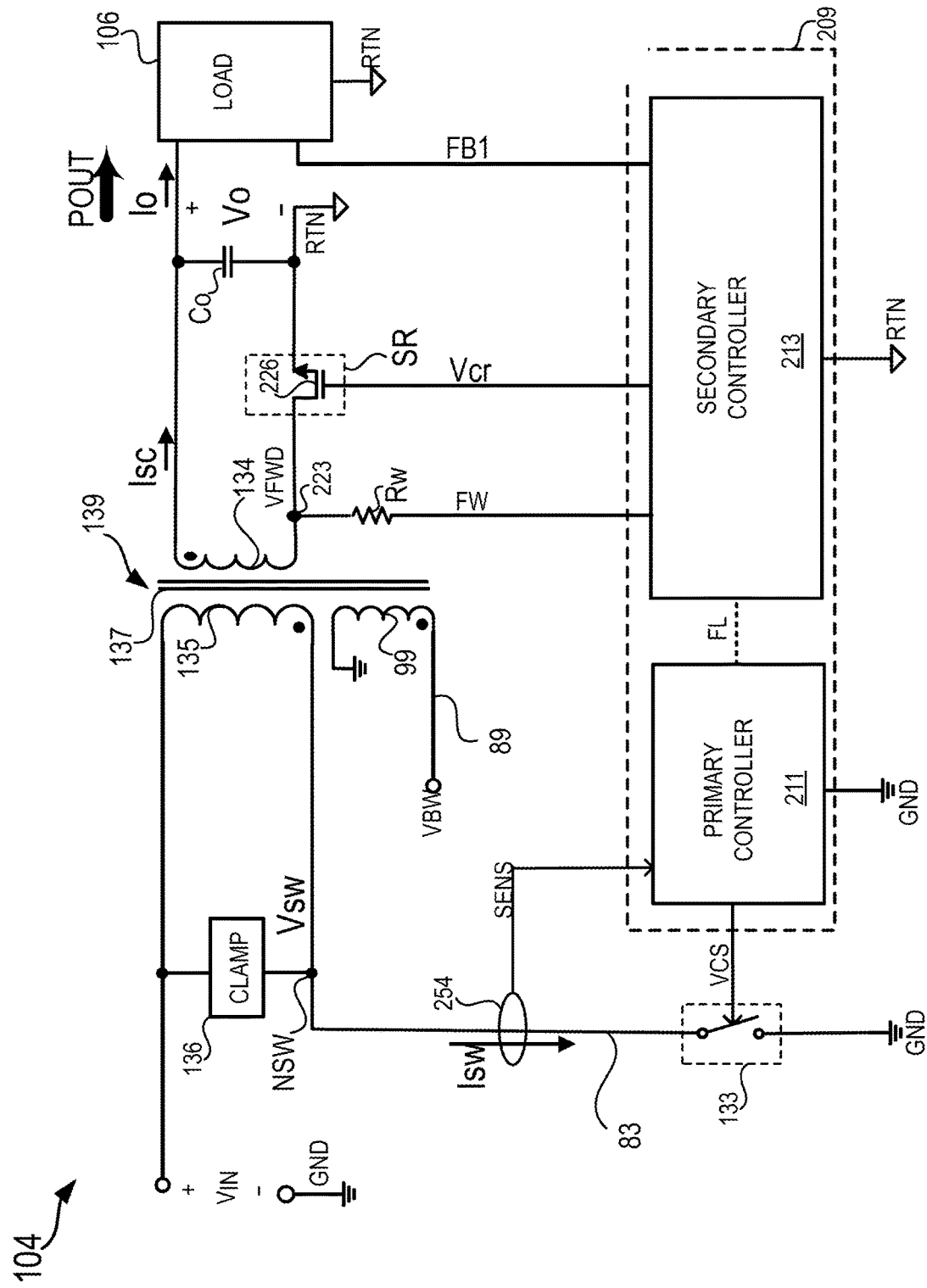
FIG. 2A illustrates a flyback converter stage and load according to an exemplary embodiment of the present disclosure.

FIG. 2A illustrates a flyback converter stage 104 and load 106 according to an exemplary embodiment of the present disclosure.

The flyback converter stage 104 may include a primary switch 133, a flyback controller 209, a clamp 136, energy transfer element 139, a synchronous rectifier SR 226, and an output capacitor Co. The energy transfer element 139 includes a primary winding 135, a core 137, a secondary winding 134, and an auxiliary winding 99. The auxiliary winding 99 may also be referred to as a bias winding 99 and/or an auxiliary bias winding 99 without departing from the scope of the present disclosure.

The flyback controller 209 may include a primary controller 211 connected to primary ground GND and a secondary controller 213 connected to secondary ground RTN. To communicate across the isolation barrier between the primary controller 211 and the secondary controller 213, signal FL may be transmitted via magnetic coupling (e.g., FluxLink™), optical coupling, or any other suitable means.

FluxLink™ is a trademark of Power Integrations, Inc., 5245 Hellyer Ave, San Jose, CA 95138.

The forward pin node 223 provides a forward pin voltage VFWD indicative of the switching state. Resistor Rw may act as a current limiter to limit current into secondary controller 213. Accordingly, the secondary controller 213 may monitor a forward pin signal FW via forward pin node 223 to determine when to turn on (and off) the synchronous rectifier SR 226. The SR 226 is controlled by a voltage signal Vcr output from the secondary controller. As illustrated, the synchronous rectifier may be realized with an NFET, although other circuit components may be employed as a synchronous rectifier without departing from the scope of the present disclosure.

During operation, the secondary controller 213 communicates with the primary controller 211 to regulate output power (i.e., load current Io and output voltage Vo) delivered to the load 106. For instance, when a feedback signal FB1 from the load 106 droops, then the secondary controller 213 may send a demand pulse via signal FL. In response to a demand pulse via signal FL, the primary controller 211 may turn on the primary switch 133 with gate drive signal VCS. The primary controller 211 may also limit a peak current of the primary switch current Isw by turning off the primary switch 133 when the switch current Isw exceeds a peak current limit. Feedback signal FB1 and the peak current limit may both be set at various values as desired.

Figure 2B:
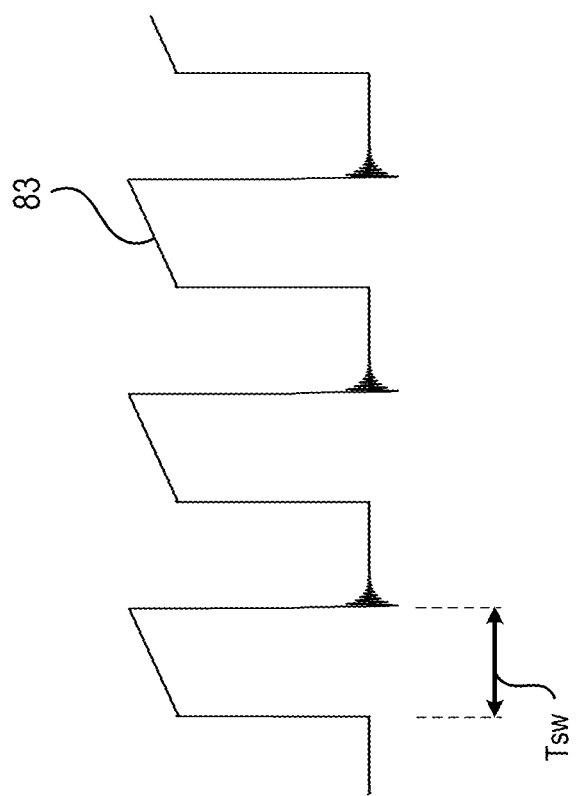
FIG. 2B illustrates a primary switch current waveform according to an exemplary embodiment of the present disclosure.

In response to a signal SENS from current sense element 254, the primary controller 211 may turn off the primary switch 133 with gate drive signal VCS. For emphasis, FIG. 2B shows an example waveform 83 of primary switch current Isw.

Figure 2C:
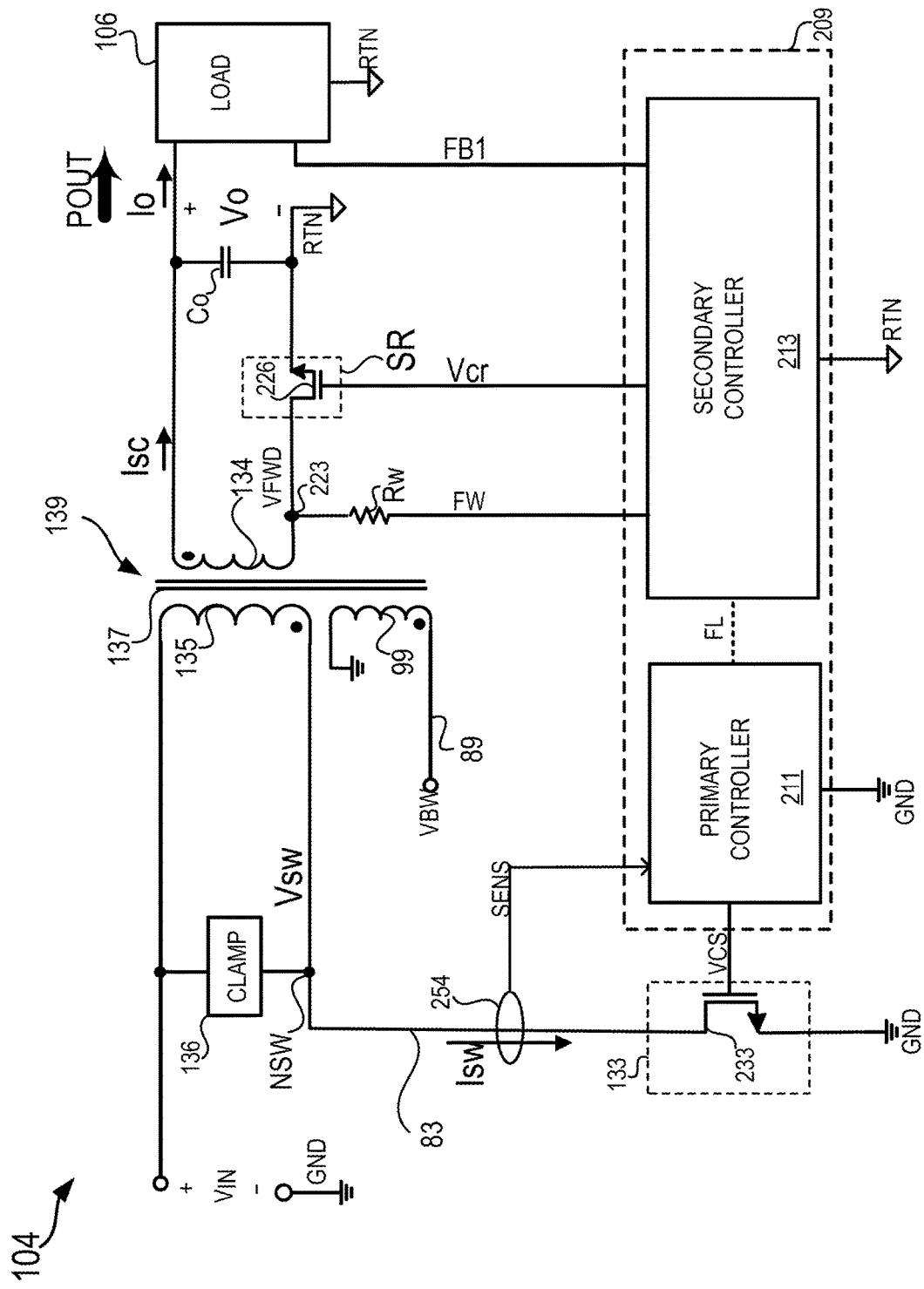
FIG. 2C illustrates a flyback converter stage and load according to an exemplary embodiment of the present disclosure.

FIG. 2C illustrates a flyback converter stage 104 and load 106 according to an exemplary embodiment of the present disclosure.

The flyback converter stage 104 is similar to that of FIG. 2A, except the primary switch 133 is realized with an NFET 233. Other realizations and embodiments for primary switch 133 are possible without departing from the scope of the present disclosure. For instance, the primary switch 133 may be realized with a gallium nitride (GaN) cascode and/or a bipolar junction transistor (BJT).

Figure 2D:
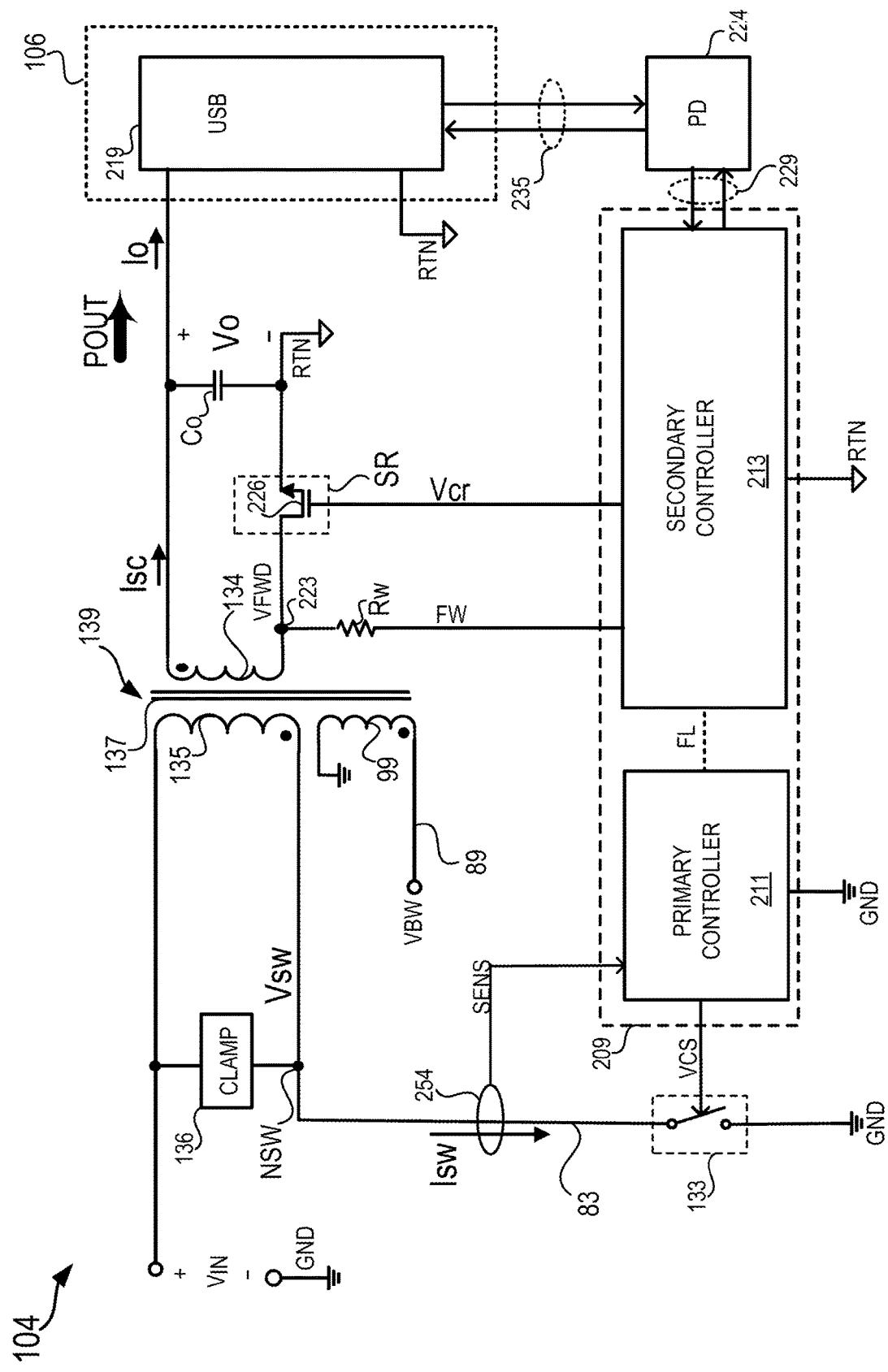
FIG. 2D illustrates a flyback converter stage and load according to an exemplary embodiment of the present disclosure.

FIG. 2D illustrates a flyback converter stage 104 and load 106 according to an exemplary embodiment of the present disclosure.

The flyback converter stage 104 of FIG. 2D is similar to that of FIG. 2A, except the load 106 comprises a universal serial bus (USB) 219. Additionally, the flyback converter stage 104 includes a USB power delivery (PD) controller 224 which may communicate the state of the USB 219 to the secondary controller 213 via PD signals 229. Signals 235 may act as another form of feedback between the USB 219 and the secondary controller 213, such that the USB 219 can deliver variable load current Io to USB 219.

Figure 3:
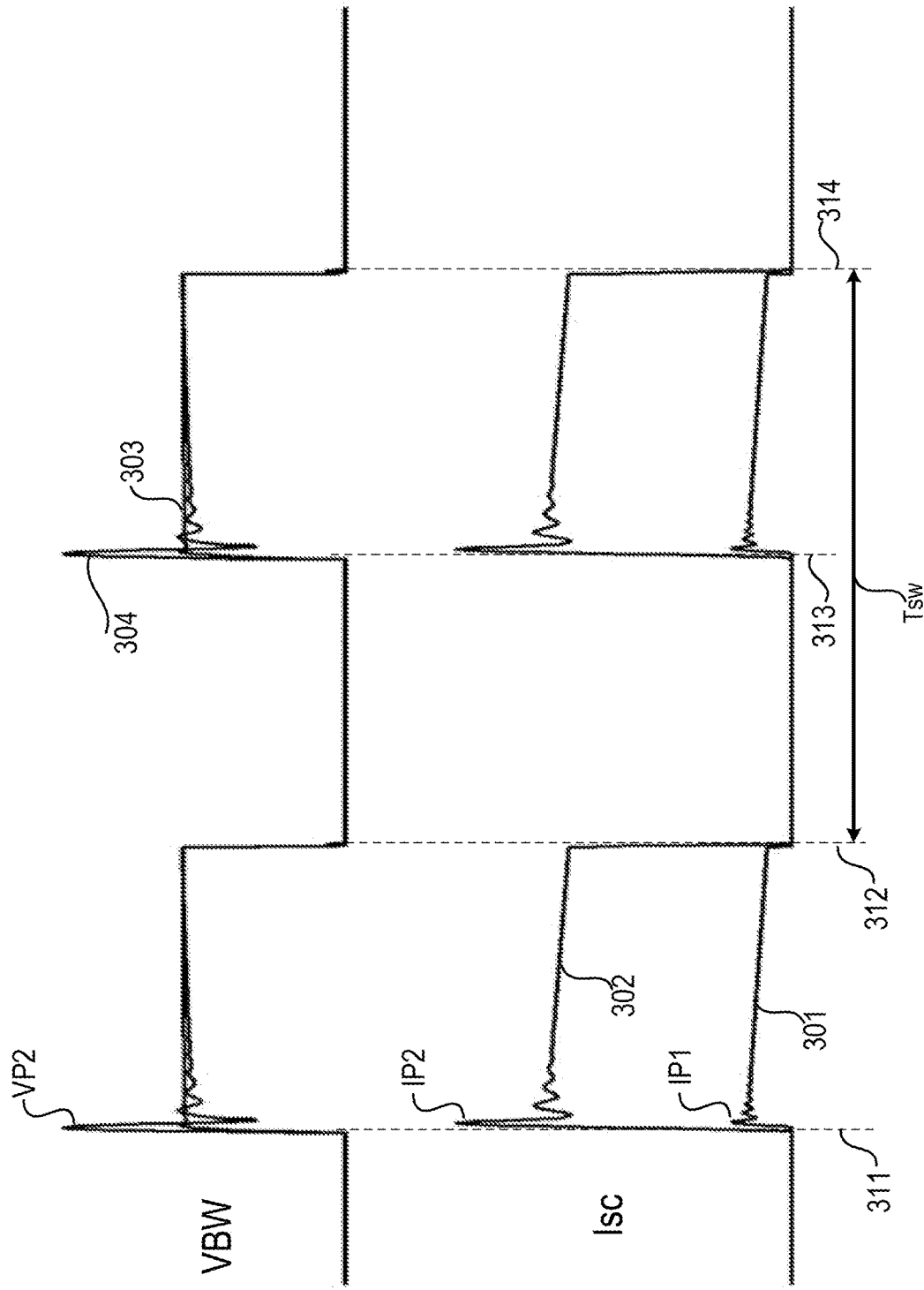
FIG. 3 illustrates waveforms according to an exemplary embodiment of the present disclosure.

FIG. 3 illustrates waveforms 301-304 according to an exemplary embodiment of the present disclosure.

With reference to FIGS. 1A-1D (for bias winding voltage VBW) and FIGS. 2A-2D (secondary current Isc), waveforms 301 and 302 correspond with secondary current Isc under different load conditions, while waveforms 303 and 304 correspond with bias winding voltage VBW. For instance, waveforms 301 and 303 may respectively correspond to secondary current Isc (i.e., the current in secondary winding 134) and bias winding voltage VBW when the load current Io is less than three amperes (3 A); while waveforms 302 and 304 may respectively correspond to secondary current Isc and bias winding voltage VBW when the load current Io is greater than twenty amperes (20 A).

Waveforms 301 and 302 of the secondary current Isc and waveforms 303 and 304 of the bias winding voltage VBW exhibit load dependent ringing. According to switch mode power converter theory, the ringing at times 311 and 313 may be due, at least in part, to a leakage inductance of the primary winding 135 and to capacitance at node NSW. Times 312 and 314 indicate the falling edges of bias winding voltage VBW and secondary current Isc.

Additionally, the peak excursions of waveforms 301-304 are load dependent. For instance, the peak voltage VP2 of waveform 304 is greater and more pronounced than that of waveform 303. Similarly, peak current IP2 of waveform 302 is greater than that of peak current IP1.

In one exemplary embodiment, the load dependence of the bias winding voltage VBW may indicate input power level. As the load current Io changes, the currents and voltages in bias winding 99 (or bias windings 98 and 99 as shown in FIG. 1D) will change. As bias winding voltages VBW and VBW2 change, the response to these changes are reflected in the response differences in the first bias voltage VBIAS1 and the second bias voltage VBIAS2. Since the current in bias winding 99 is related to the current in primary winding 135 and also related to the current in secondary winding 134, the current in bias winding 99 may indicate input power level to energy transfer element 139 as well as output power level from energy transfer element 139. This embodiment may be used when the flyback converter stage 104 uses a secondary controller 213 and when the primary controller 211 does not directly sample the load current Io.

Figure 4A:
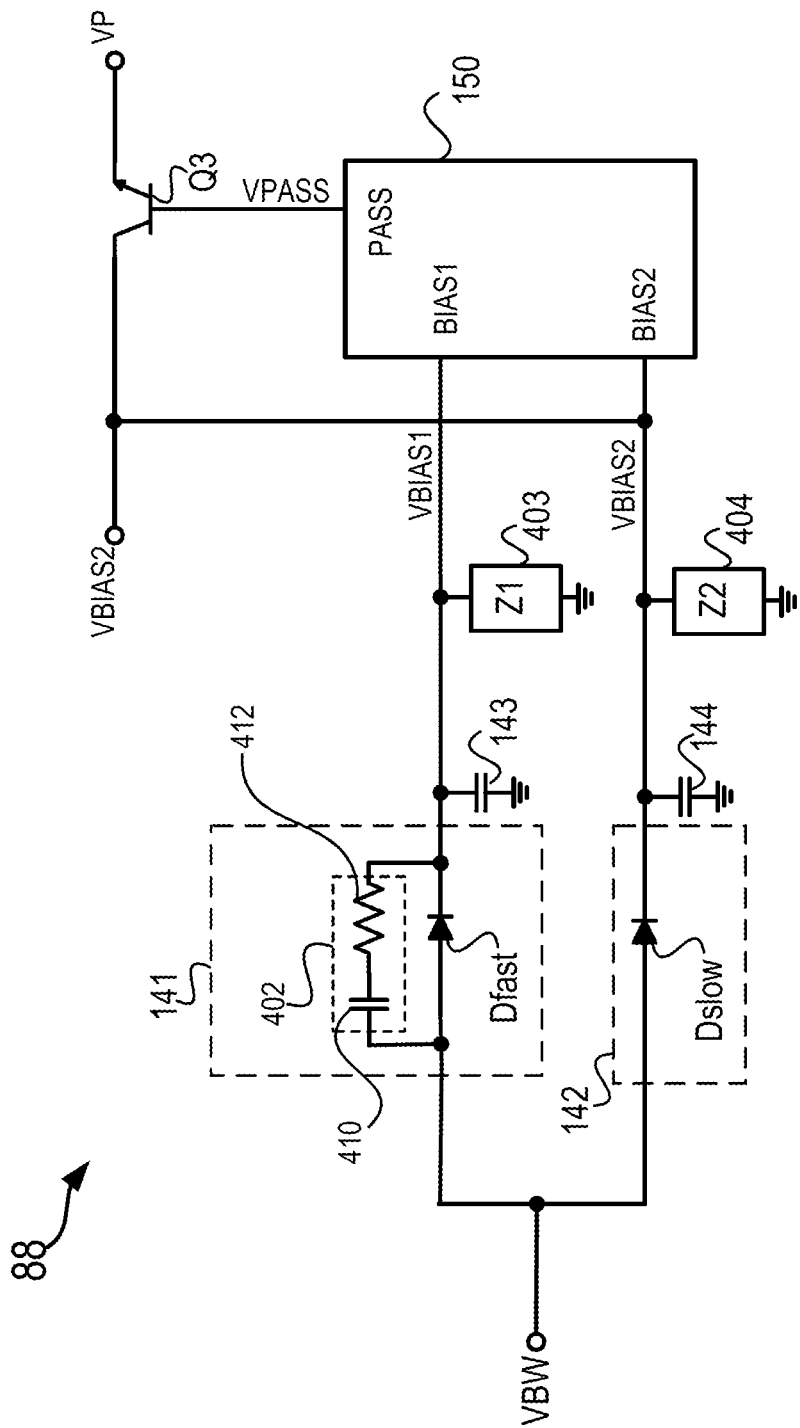
FIG. 4A illustrates an auxiliary bias circuit according to an exemplary embodiment of the present disclosure.

FIG. 4A illustrates an auxiliary bias circuit 88 according to an exemplary embodiment of the present disclosure.

As shown in the auxiliary bias circuit 88, the first circuit path 141 may include a recovery diode Dfast (e.g., a "fast" recovery diode), and the second circuit path 142 may include a recovery diode Dslow (e.g., a "slow" recovery diode). Although "fast" and "slow" may be used as descriptors, so long as the response to the bias winding voltage VBW is different between the first circuit path 141 and the second circuit path 142, a voltage difference may be obtained between the voltages of the first circuit path 141 and the second circuit path 142. For instance, in one exemplary embodiment, the recovery diode Dfast may be realized using component US1DWF-7, manufactured by Diodes Incorporated; while the recovery diode Dslow may be realized using component S1MLHRVG, manufactured by Taiwan Semiconductor Corporation.

Recovery diode Dfast rectifies the bias winding voltage VBW from the auxiliary winding 99 in the flyback converter stage 104 (see FIG. 1A) and provides the first bias voltage VBIAS1 to input BIAS1. Loading due to additional components may be modeled by impedance 403 connected in parallel with filter capacitor 143. To reduce switching related overvoltage spikes, the first circuit path 141 also includes a snubber circuit 402 electrically coupled in parallel with the recovery diode Dfast. The snubber circuit 402 may be implemented with a series capacitor 410 and resistor 412. The first circuit path 141 and second circuit path 142 may also be modified, as desired, to operate with the dual bias windings 98 and 99 shown in FIG. 1D.

Recovery diode Dslow rectifies the bias winding voltage VBW and provides the second bias winding voltage VBIAS2 to input BIAS2. Loading due to additional components may be modeled by impedance 404 connected in parallel with filter capacitor 144.

Figure 4B:
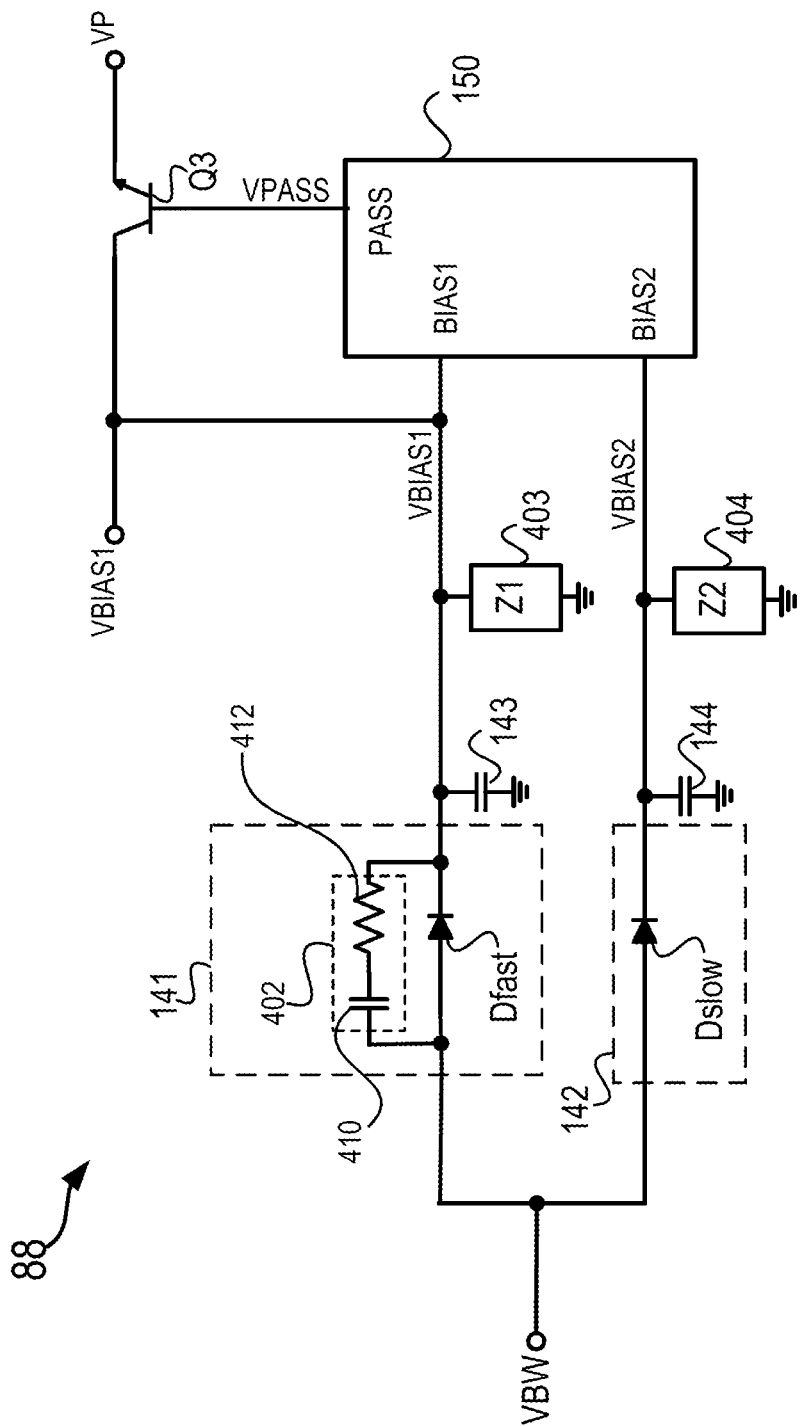
FIG. 4B illustrates an auxiliary bias circuit according to another exemplary embodiment of the present disclosure.

FIG. 4B illustrates an auxiliary bias circuit 88 according to another exemplary embodiment of the present disclosure.

The auxiliary bias circuit 88 of FIG. 4B is like that of FIG. 4A except the collector of pass transistor Q3 is electrically coupled to the first circuit path 141 instead of the second circuit path 142. Accordingly, the input power level detection circuit 150 of FIG. 4B may pass the first bias voltage VBIAS1 instead of the second bias voltage VBIAS2.

Figure 4C:
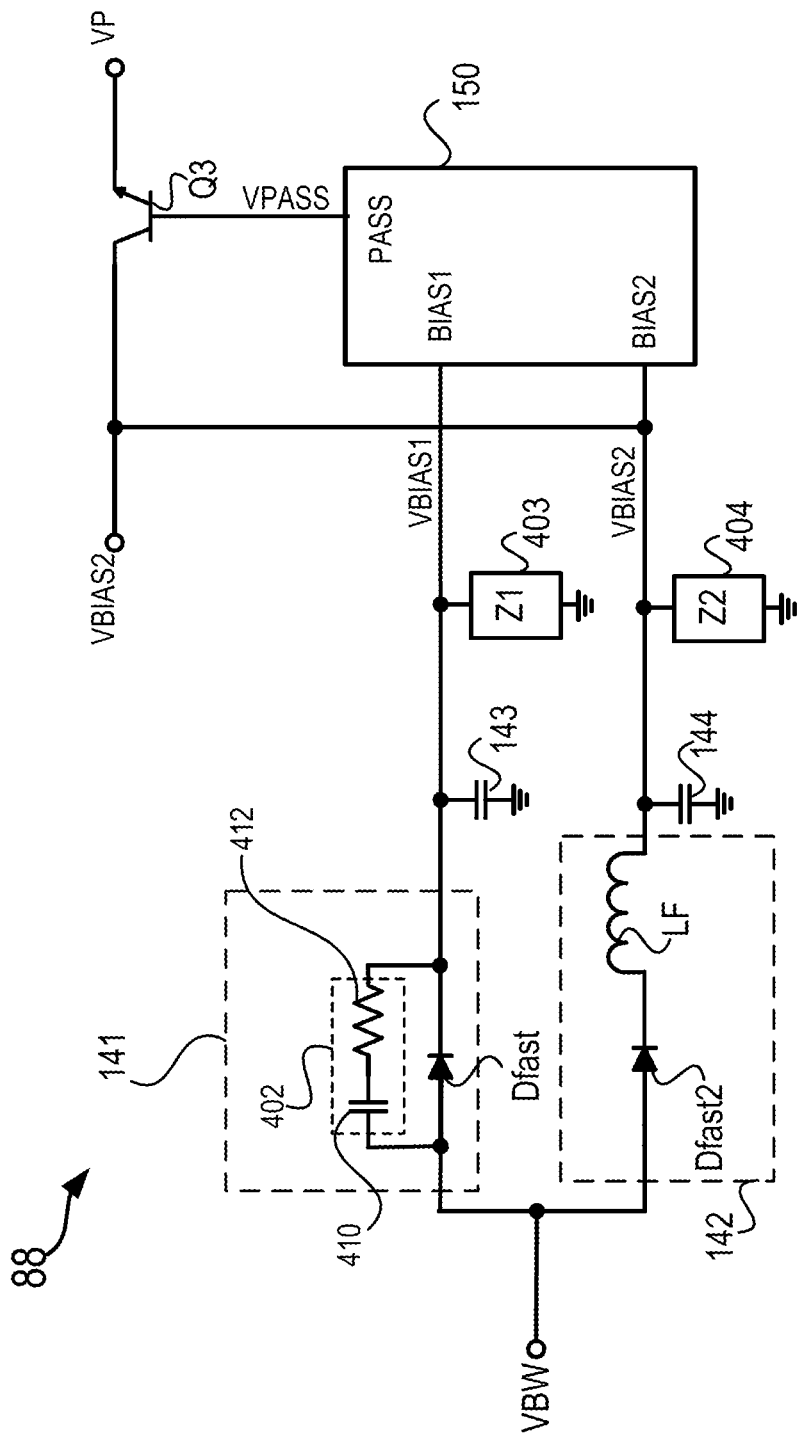
FIG. 4C illustrates an auxiliary bias circuit according to another exemplary embodiment of the present disclosure.

FIG. 4C illustrates an auxiliary bias circuit 88 according to another exemplary embodiment of the present disclosure.

The auxiliary bias circuit 88 of FIG. 4C is similar to that of FIG. 4A except the second circuit path 142 includes a recovery diode Dfast2 electrically coupled in series with a choke LF (e.g., an inductor LF).

The recovery diodes Dfast and Dfast2 may have similar characteristics. For instance, recovery diode Dfast and recovery diode Dfast2 may both be realized using component US1DWF-7, manufactured by Diodes Incorporated. However, choke LF in series with fast recovery diode Dfast2 may functionally operate like recovery diode Dslow. As one may appreciate, other realizations of a first circuit path 141 and second circuit path 142 are possible without departing from the scope of the present disclosure.

Figure 5A:
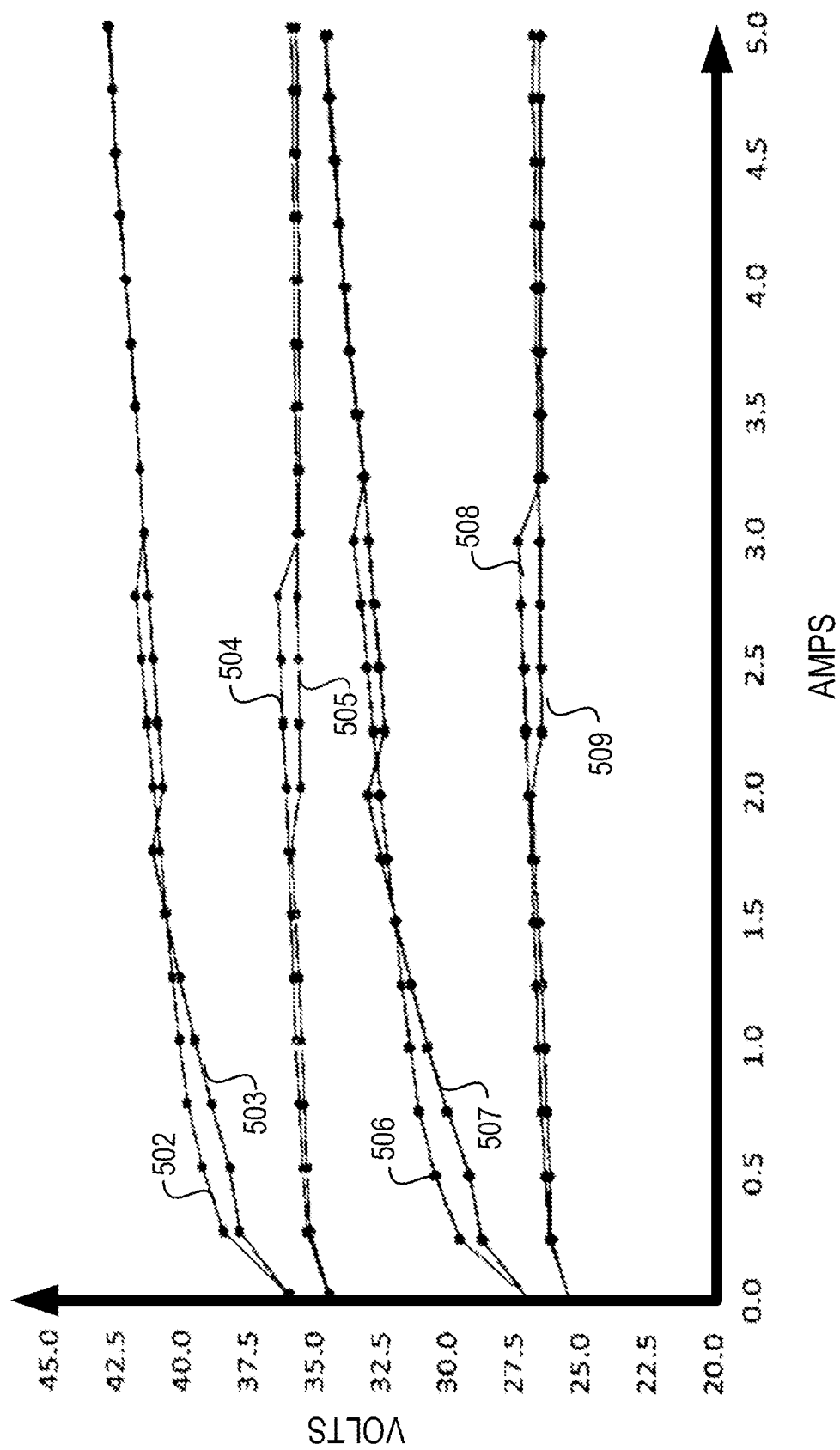
FIG. 5A illustrates graphs of measured voltage versus load current according to an exemplary embodiment of the present disclosure.

FIG. 5A illustrates graphs 503-509 of measured voltage versus load current Io according to an exemplary embodiment of the present disclosure.

Graphs 502 and 504 may respectively correspond to first bias voltage VBIAS1 and second bias voltage VBIAS2 when ac voltage Vac is two hundred sixty five volts ac (265 VAC) and output voltage Vo is twenty volts (20V); graphs 503 and 505 may respectively correspond to first bias voltage VBIAS1 and second bias voltage VBIAS2 when ac voltage Vac is ninety volts ac (90 VAC) and output voltage Vo is twenty volts (20V).

Graphs 506 and 508 may respectively correspond to first bias voltage VBIAS1 and second bias voltage VBIAS2 when ac voltage Vac is two hundred sixty five volts ac (265 VAC) and output voltage Vo is fifteen volts (15V); and graphs 507 and 509 may respectively correspond to first bias voltage VBIAS1 and second bias voltage VBIAS2 when ac voltage Vac is ninety volts ac (90 VAC) and output voltage Vo is fifteen volts (15V).

Figure 5B:
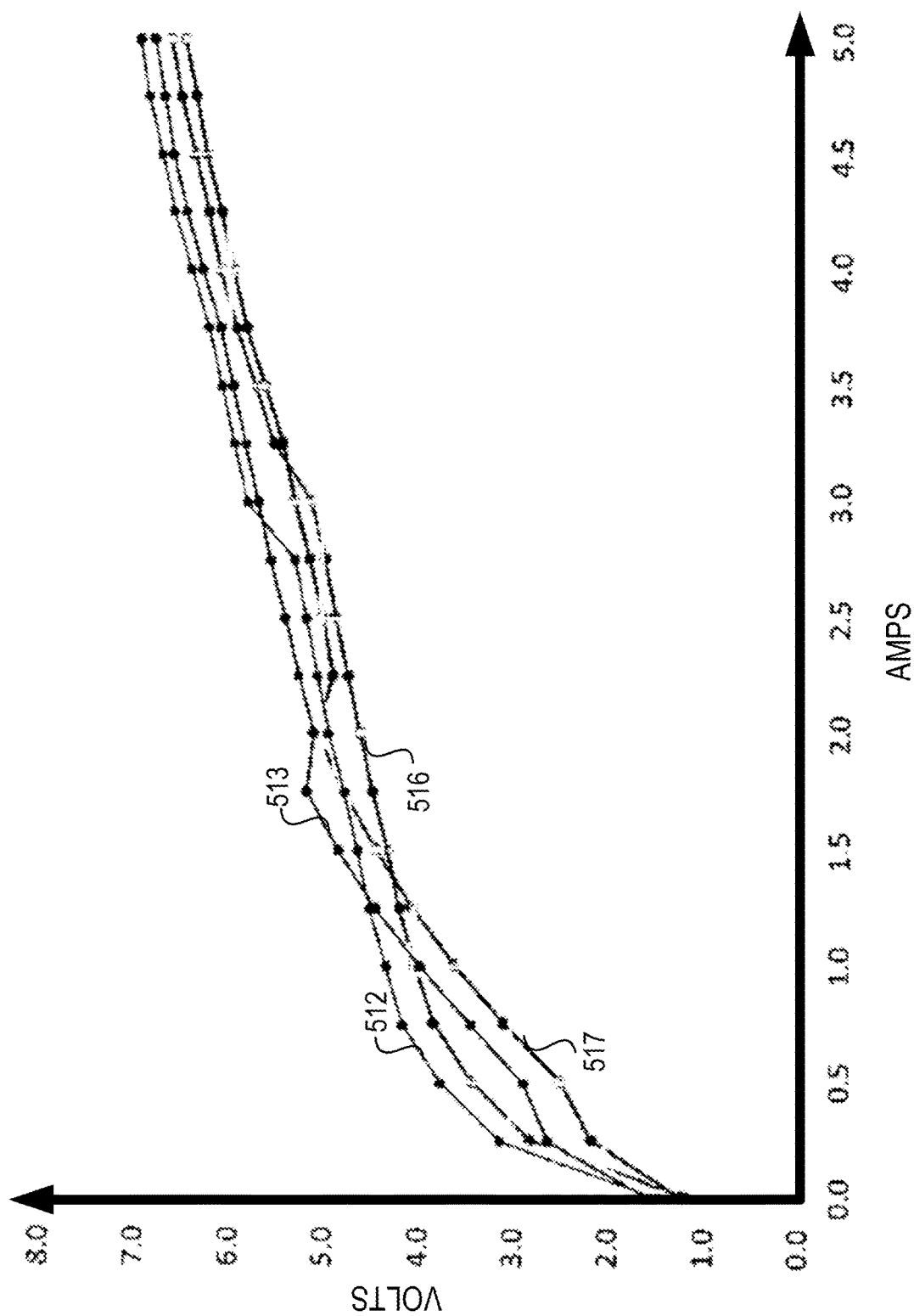
FIG. 5B illustrates graphs of measured voltage versus load current according to an exemplary embodiment of the present disclosure.

FIG. 5B illustrates graphs 512, 513, 516, 517 of measured voltage versus load current Io according to an exemplary embodiment of the present disclosure.

Graph 512 may correspond with the difference between the first bias voltage VBIAS1 and the second bias voltage VBIAS2 when ac voltage Vac is two hundred sixty five volts ac (265 VAC) and output voltage Vo is twenty volts (20V). Graph 513 may correspond with the difference between the first bias voltage VBIAS1 and the second bias voltage VBIAS2 when ac voltage Vac is ninety volts ac (90 VAC) and output voltage Vo is twenty volts (20V). Graph 516 may correspond with the difference between the first bias voltage VBIAS1 and the second bias voltage VBIAS2 when ac voltage Vac is two hundred sixty-five volts ac (265 VAC) and output voltage Vo is fifteen volts (15V). Graph 517 may correspond with the difference between the first bias voltage VBIAS1 and the second bias voltage VBIAS2 when ac voltage Vac is ninety volts ac (90 VAC) and output voltage Vo is twenty volts (15V).

Figure 5C:
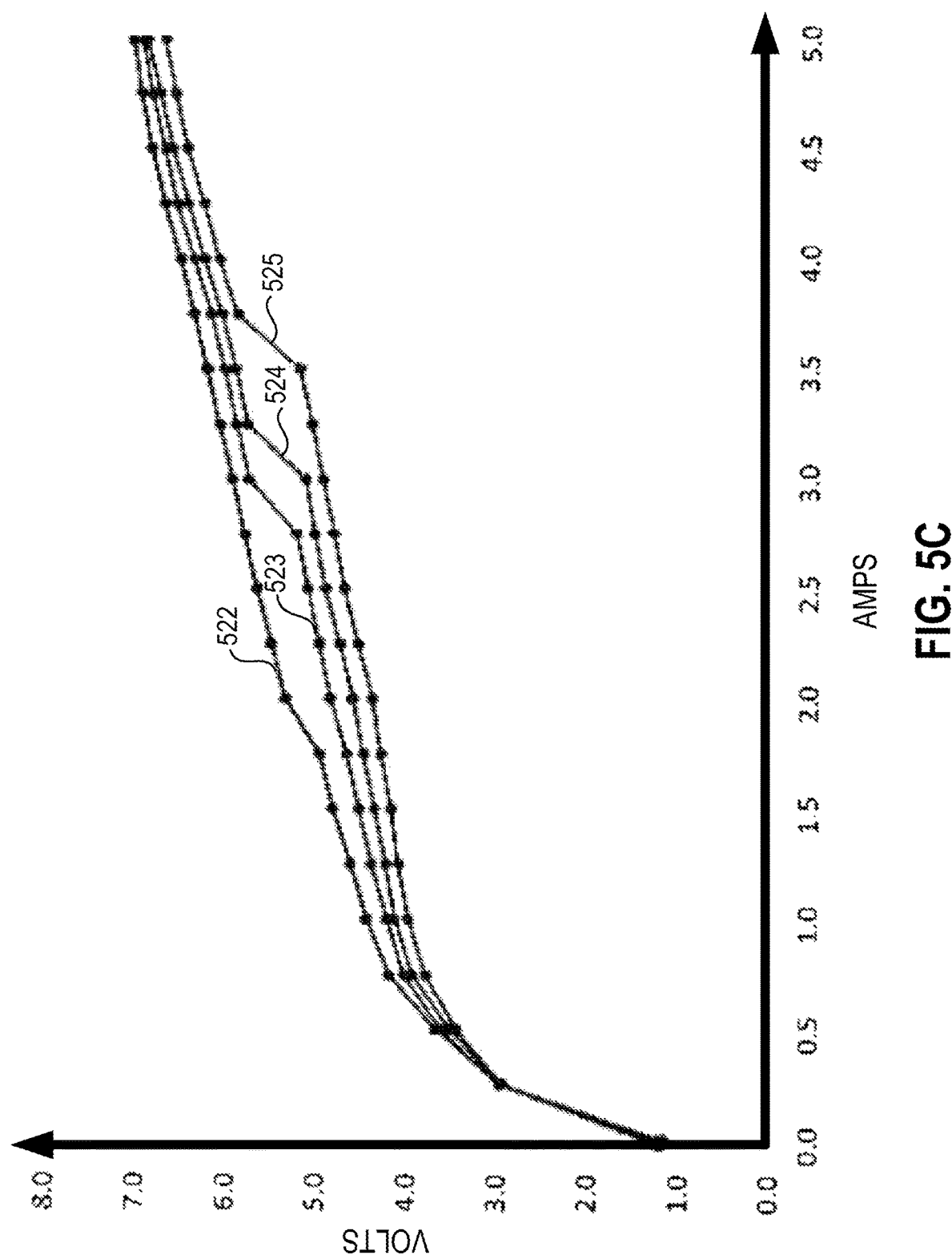
FIG. 5C illustrates graphs of measured voltage versus load current according to an exemplary embodiment of the present disclosure.

FIG. 5C illustrates graphs 522-525 of measured voltage versus load current Io according to an exemplary embodiment of the present disclosure.

Graphs 522, 523, 524, and 525 may correspond with the difference between the first bias voltage VBIAS1 and the second bias voltage VBIAS2 at forty-five degrees Celsius, twenty-five degrees Celsius, ten degrees Celsius, and zero degrees Celsius, respectively. Additionally, the ac voltage Vac may be two hundred sixty-five volts ac (265 VAC) and the output voltage Vo may be fifteen volts (15V).

Figure 5D:
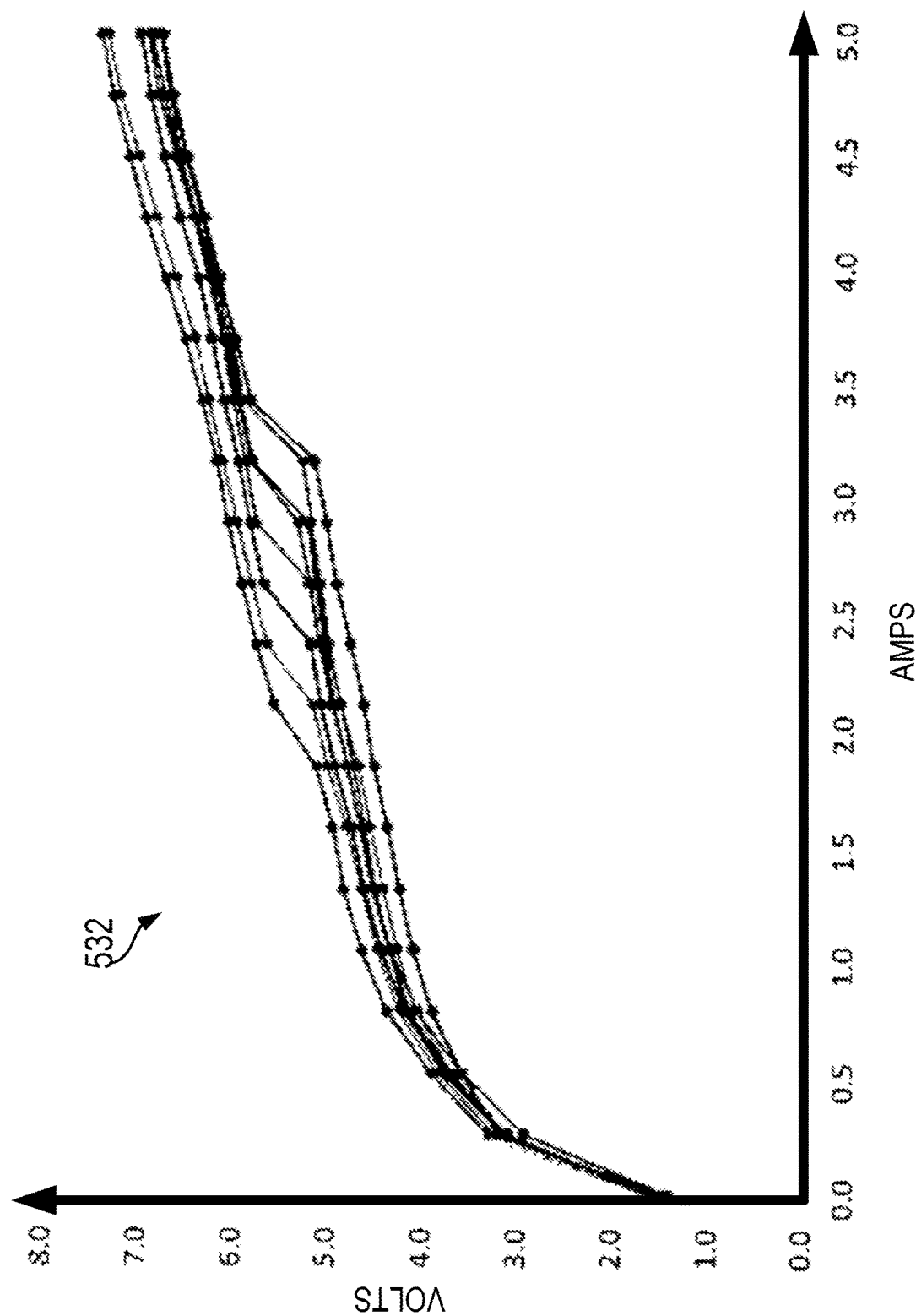
FIG. 5D illustrates graphs of measured voltage versus load current according to an exemplary embodiment of the present disclosure.

FIG. 5D illustrates graphs 532 of measured voltage versus load current Io according to an exemplary embodiment of the present disclosure.

The graphs 532 may correspond with the difference between the first bias voltage VBIAS1 and the second bias voltage VBIAS2 sampled from nine different boards (e.g., nine different circuit boards of a multi-stage power converter 100a). Additionally, the ac voltage Vac may be two hundred sixty-five volts ac (265 VAC) and the output voltage Vo may be twenty volts (20V).

The data presented by graphs 502-509, 512-513, 516-517, 522-525, and 532, may provide guidance to the skilled artisan in the design of an input power level detection circuit 150 (see, e.g., FIG. 1A). For instance, by analyzing variation like that presented by the graphs of FIG. 5A through FIG. 5D, an input power level detection circuit 150 may be tailored to meet specification, calibrated against a standard or desired value, or other parameters as desired.

Figure 6:
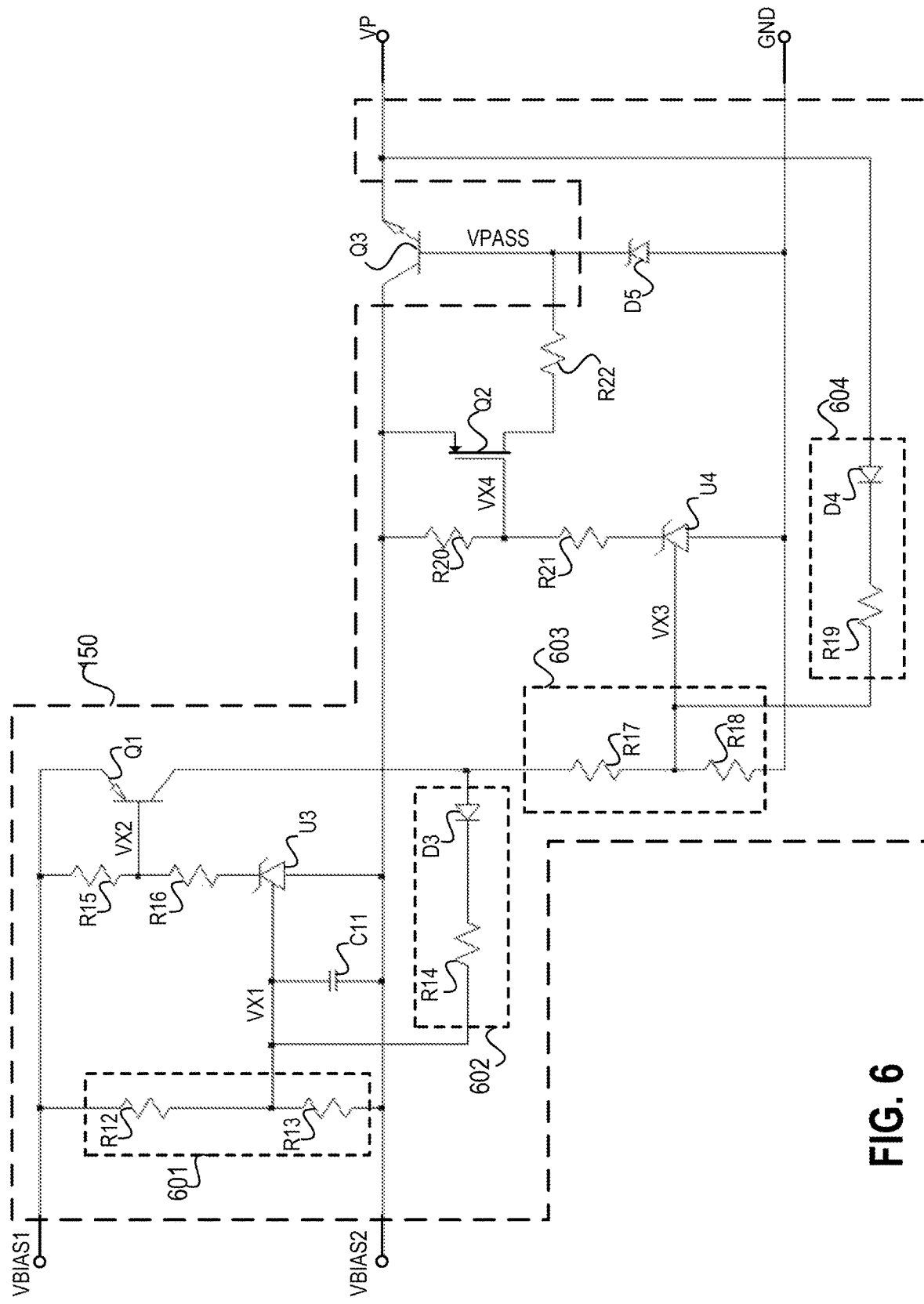
FIG. 6 illustrates an input power level detection circuit according to an exemplary embodiment of the present disclosure.

FIG. 6 illustrates an input power level detection circuit 150 according to an exemplary embodiment of the present disclosure. Input power level detection circuit 150 includes shunt regulator U3, resistor divider 601, capacitor C11, resistor R15, resistor R16, bipolar junction transistor Q1, circuit path 602, shunt regulator U4, resistor divider 603, circuit path 604, Zener diode D5, resistors R20-R22, and a p-type field effect transistor (PFET) Q2.

The shunt regulator U3 may be configured to operate as a comparator and may be realized using a component LMV431 (manufactured by Texas Instruments) or any other suitable device. Resistor divider 601, implemented by series resistors R12 and R13, may provide a voltage VX1 proportional to the difference of the first bias voltage VBIAS1 and the second bias voltage VBIAS2. When the voltage VX1 exceeds a reference value (e.g., 1.24V) of shunt regulator U3, then shunt regulator U3 may turn on and provide voltage to the voltage divider implemented by resistors R15 and R16. In response to the shunt regulator U3 turning on, a voltage VX2 may be provided at the base of bipolar junction transistor (BJT) Q1.

Capacitor C11 may provide filtering (e.g., low pass filtering) to improve the response of shunt regulator U3; and circuit path 602, including diode D3 and resistor R14, may introduce hysteresis by providing positive feedback to the resistor divider 601.

Shunt regulator U4, realized with component ATL431BQDBZR (manufactured by Texas Instruments) or any other suitable device, may also be configured as a comparator. Resistor divider 603, implemented by series resistors R17 and R18, may provide voltage VX3 proportional to the collector current from BJT Q1; and circuit path 604, including diode D4 and resistor R18, may introduce hysteresis by providing positive feedback to the resistor divider 603.

Accordingly, when BJT Q1 turns on and voltage VX3 exceeds an internal reference of shunt regulator U4, the shunt regulator U4 may drive the gate of PFET Q2 via resistors R20 and R21. For instance, in response to shunt regulator U4 turning on, voltage VX4 may decrease sufficiently to drive the gate of PFET Q2.

As illustrated, pass transistor Q3 may be switched on in response to PFET Q2 turning on; and current flowing through limiting resistor R22 may drive the base of pass transistor Q3. In turn, pass transistor Q3 may provide regulated voltage VP. In accordance with the theory of linear regulators, voltage VP may be regulated, at least in part, by a voltage of the Zener diode D5 less a base-to-emitter voltage of pass transistor Q3.

As described in connection with FIGS. 1A-1D, the regulated voltage VP may be provided to the supply input VCC2 of the PFC controller 122. Accordingly, the pass transistor Q3 allows the second bias voltage VBIAS2 to pass to the supply input VCC2 of the PFC controller 122.

Also, the input power level detection circuit 150 passes (i.e., provides) the second bias voltage VBIAS2 to the supply input VCC2 of the PFC controller 122 when the voltage difference (VBIAS1−VBIAS2) exceeds a calibrated threshold. The calibrated threshold may be based, at least in part, on empirical data like that presented in FIG. 5A-5D. Additionally, in some embodiments, the first bias voltage VBIAS1 can be passed (i.e., provided) instead of second bias voltage VBIAS2.

With reference to FIG. 6, the resistor divider 601 may be adjusted to calibrate the threshold. For instance, it may be determined empirically that a calibrated threshold of input power may be sixty five percent of the maximum. Using a mapping of output current to measured input power, data like that presented in FIG. 5A-5D may be used to determine a corresponding voltage difference between the first bias voltage VBIAS1 and the second bias voltage VBIAS2.

CONCLUSION

The above description of illustrated examples of the present disclosure, including what is described in the Abstract are not intended to be exhaustive or to be limiting to the precise forms disclosed. While specific embodiments of, and examples for, a power detection circuit for a power converter are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings herein.

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present disclosure is defined only by reference to the appended claims.

What is claimed is:

1. A power converter for delivering power to a load, comprising: a first stage; a second stage electrically coupled to the first stage, the second stage including an energy transfer element; and a sensor comprising a first circuit comprising a first diode and a second circuit comprising a second diode, wherein the first circuit has a first response to an output of the energy transfer element based on a reverse recovery time of the first diode and the second circuit has a second response to the output of the energy transfer element based on a recovery time of the second diode, wherein the sensor is configured to selectively provide power to the first stage based on a difference between the first response and the second response.

2. The power converter of claim 1, further comprising a bias winding associated with the energy transfer element, wherein the first circuit and the second circuit respond differently to an output from the bias winding.

3. The power converter of claim 1, further comprising a plurality of bias windings associated with the energy transfer element, wherein the first circuit responds to an output of a first bias winding in the plurality of bias windings and the second circuit responds to a second bias winding in the plurality of bias windings.

4. The power converter of claim 1, further comprising a switching element, wherein the sensor selectively provides power to the first stage through the switching element.

5. The power converter of claim 1, wherein the second stage comprises a flyback converter.

6. The power converter of claim 1, wherein the first stage comprises a power factor correction circuit.

7. A power converter for delivering power to a load, comprising: a first stage; a second stage electrically coupled to the first stage, the second stage including an energy transfer element; and a sensor comprising a first circuit comprising a first diode configured to provide a first bias voltage based on a first circuit response to an output of the energy transfer element, the first circuit response based on a reverse recovery time of the first diode and a second circuit comprising a second diode configured to provide a second bias voltage based on a second circuit response to the output of the energy transfer element, the second circuit response based on a recovery time of the second diode, wherein the sensor is configured to selectively provide power to the first stage based on a difference in between the first circuit response and the second circuit.

8. The power converter of claim 7, further comprising a plurality of bias windings associated with the energy transfer element, wherein the first circuit is coupled to a first bias winding in the plurality of bias windings and the second circuit is coupled to a second bias winding in the plurality of bias windings.

9. The power converter of claim 7, wherein the sensor is further configured to selectively provide power to the first stage when the first bias voltage is greater than the second bias voltage by at least a threshold.

10. The power converter of claim 7, further comprising a switching element, wherein the sensor selectively provides power to the first stage through the switching element.

11. The power converter of claim 7, wherein the second stage comprises a flyback converter.

12. The power converter of claim 7, wherein the first stage comprises a power factor correction circuit.

13. A power converter for delivering power to a load, comprising: a first stage; a second stage electrically coupled to the first stage, the second stage including an energy transfer element; and a sensor comprising a first circuit comprising a first diode configured to provide a first bias voltage based on a first circuit response to an output of the energy transfer element, the first circuit response based on a reverse recovery time of the first diode and a second circuit configured to provide a second bias voltage based on a second circuit response to the output of the energy transfer element, the second circuit response based on a recovery time of the second diode, wherein the sensor is configured to selectively provide the second bias voltage to the first stage based on a difference between the first circuit response and the second circuit response, the first bias voltage being greater than the second bias voltage by at least a threshold.

14. The power converter of claim 13, further comprising a bias winding associated with the energy transfer element, wherein the sensor selectively provides power to the first stage based on a current in the bias winding.

15. The power converter of claim 13, further comprising a plurality of bias windings associated with the energy transfer element, wherein the sensor selectively provides power to the first stage based on a first current in a first bias winding in the plurality of bias windings and a second current in a second bias winding in the plurality of bias windings.

16. The power converter of claim 13, further comprising a switching element, wherein the sensor selectively provides power to the first stage through the switching element.

17. The power converter of claim 13, wherein the first stage comprises a power factor correction circuit.

18. The power converter of claim 13, wherein the second stage comprises a flyback converter.

* * * * *